US011297362B2

(12) United States Patent
James

(10) Patent No.: US 11,297,362 B2
(45) Date of Patent: Apr. 5, 2022

(54) RECEIVER OF TELEVISION SIGNALS, RECEIVED BY AIR, CABLE OR INTERNET, EQUIPPED WITH MEMORY MEANS WITHIN WHICH SAID TELEVISION SIGNALS ARE MEMORIZED, WHERE IT IS POSSIBLE TO ARRANGE AND DISPLAY THE CONTENTS OF SAID MEMORY MEANS

(71) Applicant: Saronikos Trading and Services, Unipessoal Lda, Madeira (PT)

(72) Inventor: Robert James, Hatfield (GB)

(73) Assignee: Saronikos Trading and Services, Unipessoal Lda, Madeira (PT)

( * ) Notice: Subject to any disclaimer, the term of this patent is extended or adjusted under 35 U.S.C. 154(b) by 0 days.

(21) Appl. No.: 14/914,292

(22) PCT Filed: Aug. 29, 2013

(86) PCT No.: PCT/EP2013/067890
§ 371 (c)(1),
(2) Date: Feb. 25, 2016

(87) PCT Pub. No.: WO2015/028063
PCT Pub. Date: Mar. 5, 2015

(65) Prior Publication Data
US 2016/0212461 A1 Jul. 21, 2016

(51) Int. Cl.
*H04N 21/4627* (2011.01)
*H04N 21/4147* (2011.01)
(Continued)

(52) U.S. Cl.
CPC ... *H04N 21/2541* (2013.01); *H04N 21/25875* (2013.01); *H04N 21/4147* (2013.01);
(Continued)

(58) Field of Classification Search
CPC ............... H04L 63/0428; H04N 21/25; H04N 21/2541; H04N 21/4627; H04N 21/25875; H04N 21/4532; H04N 21/4753
(Continued)

(56) References Cited

U.S. PATENT DOCUMENTS 8,725,728 B1 * 5/2014 King ................... G06Q 10/10
707/732
9,007,473 B1 * 4/2015 Worley, III ........ H04N 21/2347
348/211.11
(Continued)

FOREIGN PATENT DOCUMENTS

EP 2 555 512 2/2013

OTHER PUBLICATIONS

International Search Report for Application No. PCT/EP2013/067890 dated Mar. 5, 2014.

Primary Examiner — Jefferey F Harold
Assistant Examiner — Franklin S Andramuno
(74) Attorney, Agent, or Firm — Workman Nydegger

(57) ABSTRACT

A receiver of television signals received via air, cable, internet, or by way of connection to an external device. The receiver includes a memory means wherein contents are stored, received through said receiver. The receiver also includes a data management means configured to organize and display the contents of the memory means. The data management means carries out an authentication procedure that allows for a determined user to be associated to his/her profile, that allows for storing and/or accessing private data of said memory means, that are associated uniquely to said determined user, and that do not appear to exist when exploring the contents of said memory means, if beforehand said authentication procedure has not been carried out by said determined user.

25 Claims, 8 Drawing Sheets

(51) Int. Cl.
*H04N 21/4415* (2011.01)
*H04N 21/4408* (2011.01)
*H04N 21/258* (2011.01)
*H04N 21/45* (2011.01)
*H04N 21/254* (2011.01)
*H04N 21/418* (2011.01)
*H04N 21/475* (2011.01)
*H04N 21/441* (2011.01)

(52) U.S. Cl.
CPC ....... *H04N 21/4184* (2013.01); *H04N 21/441* (2013.01); *H04N 21/4408* (2013.01); *H04N 21/4415* (2013.01); *H04N 21/4532* (2013.01); *H04N 21/4627* (2013.01); *H04N 21/4751* (2013.01); *H04N 21/4753* (2013.01)

(58) Field of Classification Search
USPC .................................................. 725/93, 116
See application file for complete search history.

(56) References Cited

U.S. PATENT DOCUMENTS

| | | | |
|---|---|---|---|
| 2002/0061185 A1 | 5/2002 | Hirabayashi | |
| 2003/0079186 A1* | 4/2003 | Gondo | G06Q 10/06 715/230 |
| 2003/0108227 A1* | 6/2003 | Philomin | G06K 9/00006 382/124 |
| 2004/0068477 A1* | 4/2004 | Gilmour | G06F 17/30867 |
| 2006/0064757 A1 | 3/2006 | Poslinski | |
| 2007/0156592 A1* | 7/2007 | Henderson | G06Q 20/40 705/51 |
| 2007/0261116 A1* | 11/2007 | Prafullchandra | H04L 63/102 726/22 |
| 2009/0022477 A1 | 2/2009 | Petkovic | |
| 2009/0133051 A1* | 5/2009 | Hildreth | H04N 21/4223 725/28 |
| 2011/0185378 A1* | 7/2011 | Johnson | H04N 5/44543 725/25 |
| 2011/0197214 A1* | 8/2011 | Burton | H04N 5/44543 725/13 |
| 2011/0302632 A1* | 12/2011 | Garrett | G06Q 20/10 726/4 |
| 2011/0302660 A1* | 12/2011 | Mahalingaiah | G06F 21/31 726/28 |
| 2012/0072957 A1* | 3/2012 | Cherukuwada | H04N 21/23412 725/93 |
| 2013/0138956 A1 | 5/2013 | Swist | |
| 2013/0311693 A1* | 11/2013 | Huang | H04M 1/723 710/303 |
| 2014/0333414 A1* | 11/2014 | Kursun | G06K 9/00926 340/5.82 |
| 2014/0359647 A1* | 12/2014 | Shoemake | H04N 21/44222 725/10 |
| 2016/0255505 A1* | 9/2016 | Oberheide | G06Q 20/32 |
| 2016/0379005 A1* | 12/2016 | O'Hare | G06F 21/6218 713/164 |

* cited by examiner

RECEIVER OF TELEVISION SIGNALS, RECEIVED BY AIR, CABLE OR INTERNET, EQUIPPED WITH MEMORY MEANS WITHIN WHICH SAID TELEVISION SIGNALS ARE MEMORIZED, WHERE IT IS POSSIBLE TO ARRANGE AND DISPLAY THE CONTENTS OF SAID MEMORY MEANS

The present application claims priority from International Patent Application No. PCT/EP2013/067890 filed on Aug. 29, 2013, the disclosure of which is incorporated herein by reference in its entirety.

FIELD OF THE INVENTION

It is noted that citation or identification of any document in this application is not an admission that such document is available as prior art to the present invention.

The present invention relates to a receiver of television signals, received by air, cable or internet, equipped with memory means within which said television signals are memorized, where it is possible to arrange and display the contents of said memory means.

In the following description it shall become clear that by receiver of television signals it is meant a television equipped with a screen, or a satellite or cable or terrestrial type Set-Top-Box, able to receive and display television programs, in the latter case for displaying such programs an external display is used, such as a monitor or a television screen.

Likewise it is also clear that television signals does not expressly refer to traditional television signals, but also refers to all kinds of static or dynamic audio-video formats that can be reproduced on a television screen.

The present invention also comprises the method used by the aforementioned receiver of television signals for implementing the novel functions described in the following description.

Television signal receivers have been and have become over the years little more than commodities that, notwithstanding have been constantly improved from an industrial point of view, they have more or less maintained their original functions.

Only in recent times television signal receivers have become appliances that allow for the reading and reproduction (by way of appropriate players) of multimedia content, whether such content is supplied to the receiver by way of optical supports (discs), semiconductors (internal or external memories connected to the receiver), broadcasted in any manner, or by broadband internet.

Many of such contents can be memorized, for successive display, in the internal memory of said television signal receivers.

This facility causes the necessity for arranging such contents, that are then available for all the users of the receiver of television signals, being as that it is not an apparatus of personal use, such as for instance a personal computer. Such situation therefore causes problems of privacy in the arrangement of the audio/video content memorized within a receiver of television signals.

There are no known solutions in the prior art that propose to solve the aforementioned technical problem.

SUMMARY OF THE INVENTION

It is therefore an aim of the present invention to indicate a receiver of television signals, received by air, cable or internet, equipped with memory means for memorizing said television signals, wherein it is possible to arrange and display the contents of the memory means that does not cause inconveniences for individual users of the receiver and at the same time results in being user-friendly.

It is also an aim of the present invention to illustrate a method implemented by the aforementioned receiver of television signals for carrying out the innovative functions described in the following present description.

These and other aims of the invention are reached by way of a receiver of television signals, received by air, cable or internet, equipped with memory means for memorizing said television signals, wherein it is possible to arrange and display the contents of the memory means as claimed in the annexed claims that constitute an integral part of the present description.

In synthesis, the fundamental idea of the present invention relates to a receiver of television signals received via air, cable, internet or by way of connection to an external device, comprising:

memory means wherein contents are stored received through said receiver,
  data management means configured for organizing and displaying the contents of said memory means,
  characterized by the fact that said data management means carry out an authentication procedure that allows for a determined user to be associated to his/her profile, that allows for storing and/or accessing private data of said memory means, that are associated uniquely to said determined user, and that do not appear to exist when exploring the contents of said memory means, if beforehand said authentication procedure has not been carried out by said determined user.

Such characteristics and advantages of the present invention will become more clear from the description of an exemplative embodiment as illustrated in the annexed drawings, supplied purely as a non limiting example.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
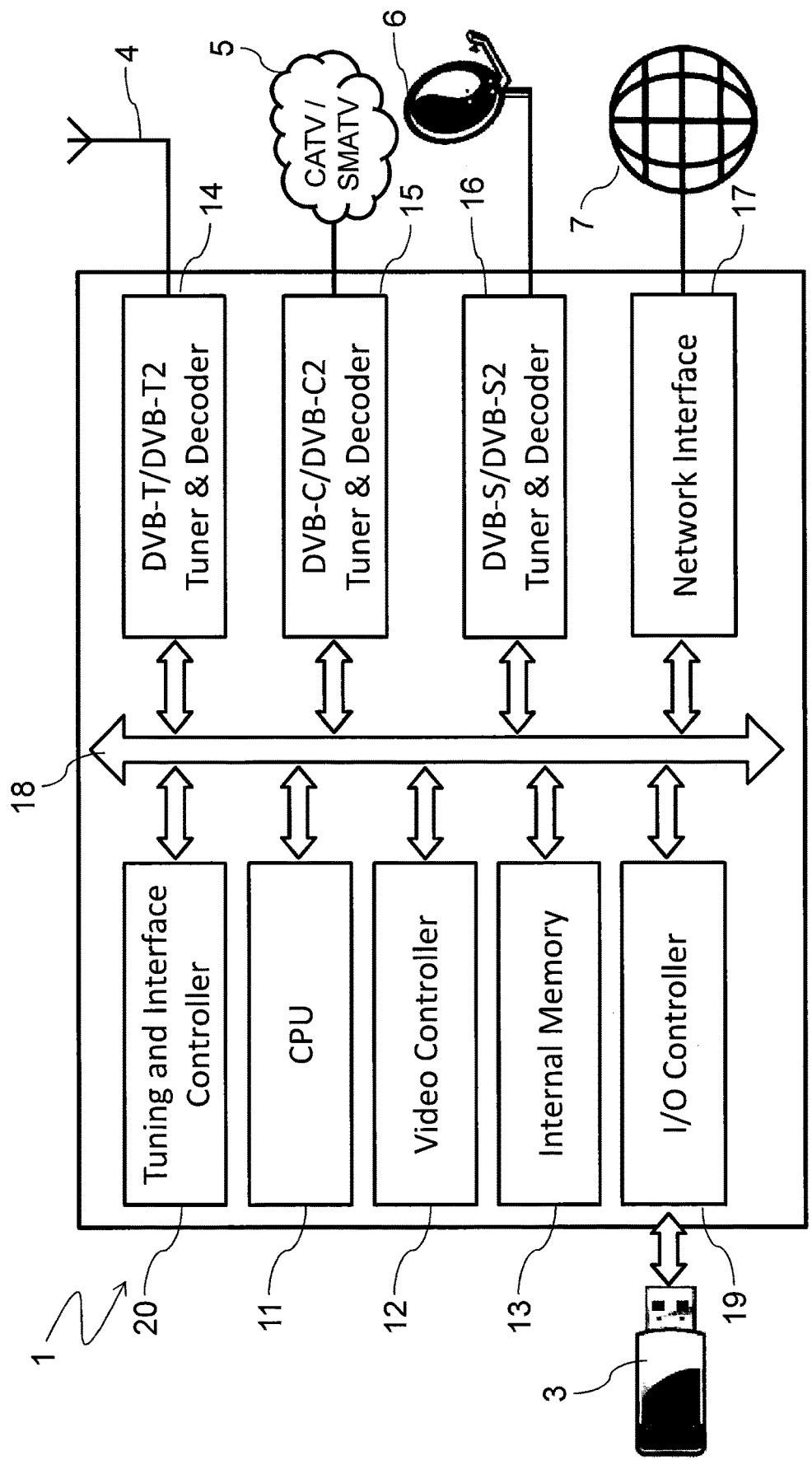
FIG. 1 illustrates a receiver of television signals, received by air, cable or internet, equipped with memory means according to the invention.

With reference to FIG. 1, a receiver of television signals, received by air, cable or internet is illustrated; in addition to that, as mentioned, thanks to the use of appropriate players, the receiver 1 is able to operate as an apparatus configured for the reception, memorizing and reproduction of any audio/video signals. Such receiver 1 comprises memory means 3, 13 and data management means 11; such data management means 11 are also configured for arranging and reproducing contents of said memory means, taking into account that access can be given to the contents of said memory means 3,13 based on a set of rules that will be better described in the following description.

The data management means 11 preferably comprise instructions that allow, upon execution by processing means, such as for instance a CPU, for managing access to the contents of the memory means 3, 13.

The receiver 1 also comprises the following elements:
Data management means 11 indicated in the figure with the symbol CPU;
A video controller 12, comprising a graphics processing unit, GPU, configured so as to supply the display screen with a static type video flow (for instance generated by pictures) or a dynamic video flow (for instance generated by a video file memorized in the receiver 1 o received through air, cable or internet, or coming from an external memory device), where said video flow is suitable to be displayed on an LCD panel and/or a plasma panel and/or a video-projector and/or an external monitor, namely a display device associated to a receiver of television signals;
An internal memory 13 containing at least the instructions necessary for allowing the data management means 11 to carry out the phases of the method according to the invention, that will be better described during the present description;
A tuning and interface controller 20 that allows for controlling and managing the operation of one or more network tuners and interfaces contained within said receiver 1;
A communication bus 18 that allows the exchange of information between the data management means 11, the video controller 12, the internal memory 13, the tuning and interface controller 20 and the remaining components in said receiver 1; and
Data input means (not illustrated in the annexed drawings) that allow the receiver 1 to receive commands from a remote control and/or another man-apparatus interface.

As an alternative to the communication bus 18, it is possible to connect, by means of a star type architecture, the data management means 11, the video controller 12, the internal memory 13, the tuning and interface controller 20, the data input means and the remaining components contained in said receiver 1.

The receiver of television signals 1 may be a normal TV or a Smart TV or a digital/personal video recorder (DVR/PVR) or a set top box or other similar receiver. The important point, in accordance with the present invention, is that the receiver of television signals 1 is able to memorize content selected by the user and received through the following elements described below:

A tuner and decoder for digital terrestrial television 14, preferably according to the standard DVB-T and/or DVB-T2, connected to an antenna 4 for the reception of terrestrial television signals;
A tuner and decoder for digital cable television 15, preferably according to the standard DVB-C and/or DVB-C2, connected to distribution network 5 preferably of the type CATV (cable television networks) or SMATV (satellite master antenna TV);
A tuner and decoder for digital satellite television 16, preferably according to the standard DVB-S and/or DVB-S2, connected to a satellite dish antenna 6 (or other type) for the reception of television signals transmitted via satellite;
A network interface 17 connected by way of cable or a Wi-Fi network to a data network 7, preferably a intranet/internet network;
where both the decoders 14,15,16 and the network interface 17 are in communication with the other components of the receiver of television signals 1, preferably by way of the communication bus 18.

By way of any of the tuners and decoders 14,15,16 and/or the network interface 17 or an external memory device 3, the receiver of television signals 1 can give access to users of digital content (for instance video files, audio files, pictures, documents, generic files and the like) that may constitute private contents. Said contents may be reproduced on the display means and/or stored in the internal memory 13 of the receiver of television signals 1.

A private content is defined, in the present context, as content of interest for a first user, wherein said first user doesn't want to share his/her interest for such content with a second user.

Such definition is understandable from the following example: a user A accesses or has accessed a content C and doesn't want another user B to know that he/she accesses or has accessed such content C, independently from the possibility that user B may also access said content C through a different type of user profile, as described in the following.

Private contents may also be defined as private data.

Said private data can be totally or partially stored in the internal memory 13 or, alternatively or in combination, in removable memory means (external memory) 3, for instance an external flash memory 3, accessible by way of a USB interface (USB flash drive), a portable hard disk (HDD, SSD, etc.), or any other type of external memory 3 accessible by way of Wi-Fi or Blue-tooth connection or similar. In order to enable the possibility of accessing the removable memory means 3 by way of the receiver of television signals 1, said receiver 1 may also comprise an Input/Output Controller 19 that, being in signal communication with the data bus 18, allows the receiver of television signals 1 to read and/or write data, from among which also private data, on the removable memory means 3 or vice versa from the removable memory to the internal memory 13. The internal memory 13 can also receive data from an external apparatus such as a camera, a recorder or an audio player.

The organization of the internal memory 13 and/or the external memory 3 can be carried out in such a way that every private content file is stored with a label which uses the authentication code relative to the user that generated the same, so as that the contents in the section of the memory 13 where said private content file is stored cannot be read, if beforehand the authentication code has not been correctly input, which is the equivalent to said label.

This solution is particularly effective for the private contents stored on the external memory 3, being as that the authentication label could be a code of an encryption system which doesn't permit external reading, if such code has not previously be introduced. Obviously, aside from the receiver of television signals 1, a computer enabled to read and reproduce such private contents of said external memory 3 would also have to be equipped with corresponding decryption software. In this way a simple and user-friendly data encryption system for storing data on an external memory device 3 is obtained.

According to the known art, it is only possible to personalize a receiver of television signals 1 by defining user profiles of the receiver 1. A user profile, according to the prior art, allows for instructing the data management means 11 to recognize a determined user, to which a determined profile is associated, and suggesting subject related types of television programs based on those that are normally selected by a said user.

Therefore the prior art does not take into consideration the problems relating to privacy of the contents stored within the receiver 1 nor does it consider the fact that a user could have an interest in limiting access to third parties to his/her allotted sections of the internal memory 13 and/or the removable memory means 3, nor wants that certain contents appear to exist when exploring the contents of said memory means.

Moreover, the known systems for profiling/personalizing a user require that icons or similar appear on the screen with the names of the various users that own a profile and from these names it is then necessary to select a profile and insert a corresponding password.

In this way all the users that use the receiver 1 have access to a list of users and/or usernames that have a profile registered on the television receiver, with the consequences that will become clear in the following.

In order to improve privacy, therefore also the presence of private data/contents, it is necessary to reduce the probability that a second user is able to discover, within the receiver 1, the existence of other profiles associated to other users. In fact the mere display of one or more user profiles would allow a generic user to attempt to identify the person/s to which such profile/s is/are associated, for instance knowing the users of the receiver 1 or reading the names that identify each profile or similar, thus permitting a generic user to suspect the existence of private data/content.

A method for organizing and displaying contents received by a receiver of television signals, as previously defined, by air, cable, internet or by way of connection to an external device 3, and for storing said contents in memory means 3, 13, that provides for the management of user profiles of the receiver 1, solving the aforementioned problems, comprising at least one of the following phases:
  a. start an operation of user authentication by acquiring and validating an authentication code, entered by way of data input means, without having to select a user profile from a list of user profiles available on the receiver 1;
  b. activate the user profile associated to the authentication code entered during phase a.
  c. associate the operations carried out on the receiver 1 within the user profile selected during phase b, until exiting from the selected profile.

In addition to that mentioned herein above, and for better protecting the private data/content, it is possible to configure the receiver 1 so that a new user profile is created associated to the authentication code, if during phase b., it isn't possible to access a user profile associated to the code entered during phase a. (for instance because the user profile does not exist in the memory 13). In other words, when an authentication code is entered and isn't yet associated to a user, such input creates a new user profile which from that moment on will operate as mentioned above in connection to previously existing profiles. Being as that the user may erroneously input incorrect authentication codes, but however does not wish to create new profiles, in order to enable the creation of a new user profile it is necessary, after having input the code, to carry out a confirmation procedure for instance by way of selecting a confirmation key, such as "OK". It is important to note that according to the invention the desired user profile is selected or automatically created upon inputting the authentication code, without having to scroll through a list of user profiles, selecting one, and subsequently causing the user profile to be activated by way of a password.

The authentication code may be a numeric or alphanumeric string of characters, preferably equal to 6 or more symbols. Such authentication code may be specified by way of data input means that may comprise voice recognition means, body movement recognition systems, a remote control or a keyboard (for simplicity, not illustrated in the figures) in signal communication with the receiver of television signals 1 through electrical signals transmitted by cable, electromagnetic waves, infrared waves or similar. The remote control system may also be a smart phone or tablet. In the case of a smart phone the inputting of the authentication code by way of the user may not be necessary, being substituted in this case by automatically transmitting to the receiver 1 a unique code contained within the smart phone, such as the identification number of the SIM card, or the identification code of a Near Field Communication (NFC), or by way of the smart phone owner's finger print, identified by the smart phone through a dedicated reader equipped by its software.

A further system for inputting the authentication code may consist of face recognition means of the user, where the television receiver 1 is equipped with a camera and when the user positions his/her face close to the camera, so as that this can recognize only the user's face and from the face's features obtain a unique code to be used as an authentication code of said determined user. In this case, the code may be a binary string generated by a face recognition algorithm that processes the signal coming from the camera.

So as to avoid showing the presence of private data/content, the carrying out of phase a. by way of the receiver 1, namely the request for a authentication code, can be carried out by default as the initial screen upon turning on said receiver 1, so as to appear as a simple personalization interface of the functions available by the receiver 1 and not to cause suspicions within a group of users.

As an alternative or in addition to that said above, the receiver 1 can carry out phase a. upon receiving a request from a user, even after having turned on said receiver 1, for instance by activating the authentication procedure through a remote control, by pressing a particular dedicated key or a generic key pressed for a predetermined amount of time (per example 3-5 seconds) or by way of a combination of keys, or by way of a user interface element provided said receiver 1.

So as to make possible the use of the receiver of television signals 1, even by people who are not able to or do not want to take advantage of the method according to the invention, the receiver 1 can stop carrying out phase a., namely stop requesting input of an authentication code, after a given amount of time has passed (also called waiting interval) from a determined event, such as for instance the turning on of the receiver 1, the input of a single symbol of the authentication code or pressing a determined exiting key, such as "Return" or "Exit". This makes use of the receiver of television signals 1 possible without having to activate a user profile, so as to allow for a so-called "public" functioning of the receiver of television signals 1.

When the receiver of television signals 1 operates in the "public" functioning mode, the receiver 1 will not allow access to any of the private data/contents stored in the memory 13 and/or in the removable memory means 3. Obviously, whenever the receiver 1 recognizes a profile of a determined user, the private data/contents associated to other user profiles it will not be able to be displayed or reproduced.

To exit from a mode of use associated to a profile of a determined user, a plurality of methods may be used: turning off the receiver 1, pressing a particular dedicated key or a generic key pressed for a predetermined amount of time (per example 3-5 seconds) or by way of a combination of keys, or by way of a user interface element in said receiver 1 and so on.

In order to make possible the method according to the invention implemented in a receiver of television signals 1, said method can be inserted as a software in said data management means 11 using a programming language, such as C/C++, C#, Visual Basic, Fortran, or similar. As a total or partial alternative to the implementation via software, part of the method can be carried by specifically developed circuitry and/or by programmable hardware components, such as for instance a CPLD, a FPGA or similar.

Figure 2:
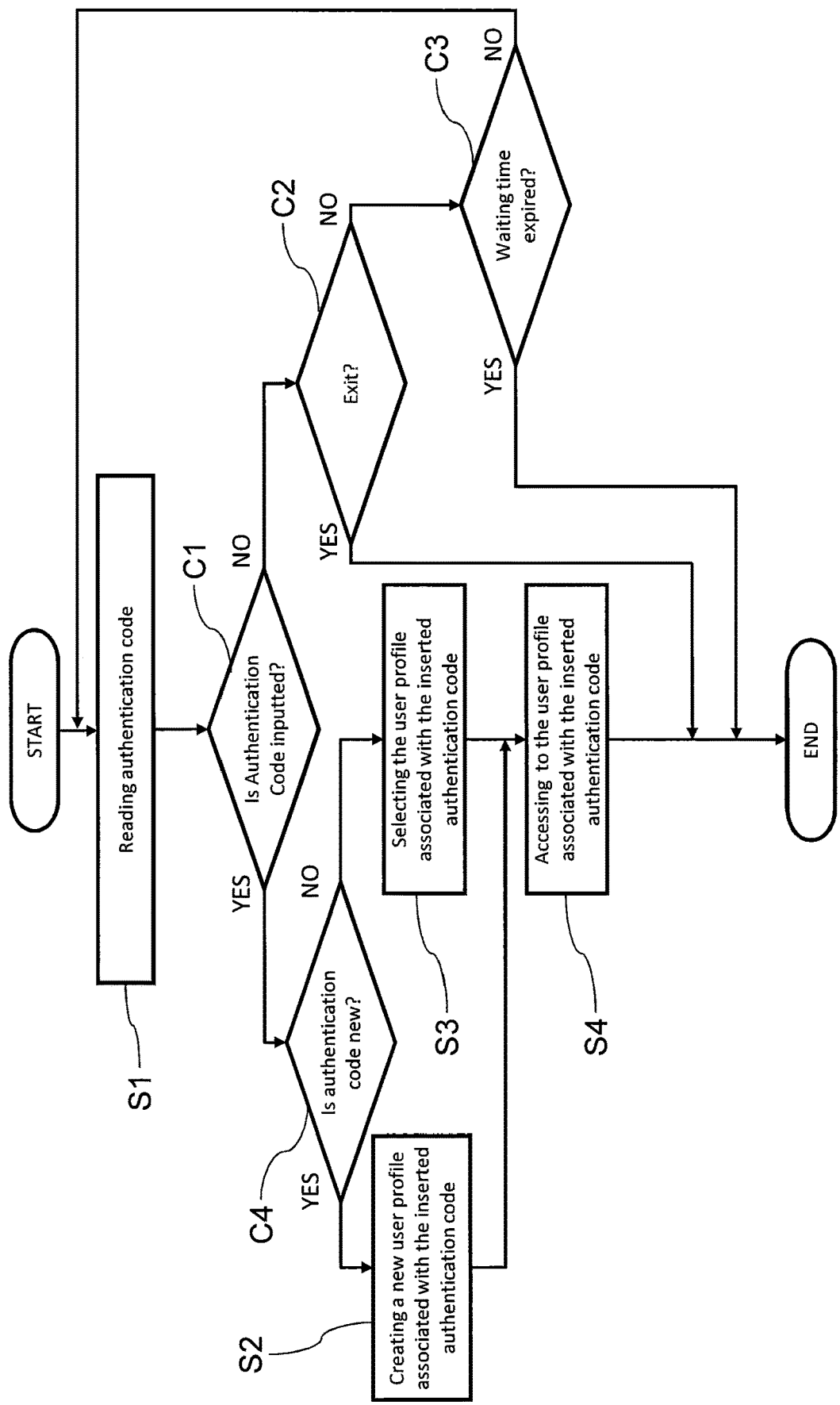
FIG. 2 illustrates a flow chart of an implementation of a method used in the receiver of television signals according to the invention.

With reference to FIG. 2, an implementation of the above mentioned method described and applied to the receiver of television signals 1 also comprises the following states:

A code entry state S1, during which the receiver 1 operates the phase a. of the method according to the present invention, making it possible for the user to insert in the receiver 1 an authentication code, without having to select a user profile from a list of user profiles. That is to say in this state with the simple inputting of the authentication code the relative user profile is activated. This phase is preferably initiated by way of a remote control and as previously described, wherein the code, once inserted, is read by the receiver;

A new profile creation state S2, during which the receiver 1 operates part of phase b. of the method according to the invention, creating a new profile used by the receiver 1 if the authentication code supplied does not correspond to a code previously stored and the user wants to create a new one; obviously each time a new authentication code is entered and a new profile is created under control of the user, such data is stored in the memory 13;

An activation state of an existing profile S3, during which the receiver 1 operates part of phase b. of the method according to the invention, selecting an existing user profile of the receiver 1, that is to say a profile previously created, obviously each time a new authentication code is entered, thus creating a new profile under the control of the user, such data is stored in the memory 13; and A profile access sate S4, during which the receiver 1 operates part of phase c. of the method according to the invention, accessing and associating the operations carried out on the receiver 1 within the user profile selected during the time the receiver 1 operates in state S3 or created by said receiver 1 during the time said receiver 1 remains in state S2.

When the receiver 1 is in a working situation and an authentication function is requested, the abovementioned method has to be executed, the receiver initiates the state S1.

During the time in which the receiver 1 remains in this state S1, the receiver verifies that an authentication code has been entered by the user (option block C1), for example considering that the procedure for inserting a code is finalized when the length of the inserted string is equal to that predetermined by the authentication code and/or when a validation key has been activated, preferably the "OK" key, of the remote control or the like. In the case in which the authentication code has not been entered by the user and the exiting of the method is selected (option block C2) or a timeout interval has expired (option block C3), the receiver 1 finalizes the execution of the method according to the invention. On the other hand, if the user enters the authentication code, the receiver goes on to verify whether the input code is new (option block C4), that is, it verifies whether code entered is not associated to an existing user profile in the memory 13; if the authentication code is determined as being new, the receiver 1 operates in the state S2, while, if the code is already associated to a profile it operates the state S3.

After the receiver 1 has finalized its time in state S2 or S3, retrieving or creating all the information relative to the user profile associated to the authentication code entered during the state S1, the receiver 1 enters the sate S4, in which the user profile is activated, configuring the receiver 1, for instance, to provide access to the area of the memory reserved to said profile and associating and storing the future operations carried out on the receiver 1 until it is working inside the previously selected user profile; the receiver 1 finalizes the execution of the part of the method according to the invention when the relative exiting procedure is activated.

As long as the receiver of television signals 1 is in the state S4, the receiver 1 is configured to access the private data associated to the user profile identified with the specific user code entered during the course of carrying out phase a. of said method. Following activation of the profile, the storing of new data accessed by the user, will remain within the space of the memory allotted to said profile for future use.

More in particular, it is to be noted that all the operations that a given user carries out while in his/her profile and that cause private data/contents to be stored, upon request of the user, generate information that remain within the area of the memory 13 allotted to the profile and are only usable within that determined profile. Therefore when exiting said profile, because for example the receiver 1 is turned off or a specific key or combination of predetermined keys are pressed, such private data are no longer available until said user profile is reactivated once again.

The memories 3, 13 (where the private data/contents are stored) are preferable structured in accordance with a file system such as FAT32, NTFS, EXT3 or similar.

The use of a file system allows for creating a hierarchical folder organization (also called content groups), where in each group it is possible to store other folders and/or files.

So as to make the invention viable, a possible arrangement of the memories 3,13 could comprise, for each user profile of the receiver 1, a main folder containing at least one or more sub-folders each of which containing a given category of content.

In a preferred embodiment, each main folder may be identified by a name comprising a fixed section, for example 'User_', and a variable section for example equal to the authentication code, where each main folder contains one or more of the following sub-folders:

A sub-folder for photographs, identified with the name "photo";

A sub-folder for video, identified with the name "video";

A sub-folder for films, identified with the name "films";

A sub-folder for audio, identified with the name "audio"; and

A sub-folder for generic files, identified with the name "file", that can contain documents loaded by the user, it may also contain configuration data of the receiver 1.

The main folder and the relative sub-folders can be created by the receiver 1 when said receiver 1 is operating the state S2 or during use of the receiver 1 (for instance when downloading a video from the internet or recording part of a television service and the like).

The expert in the art may make use of a different arrangement of the memory 13 with regards to that described hereinabove, without however departing from the teachings of the present invention.

Moreover, the file system could be advantageously configured to directly manage the access rules to the various profiles.

Figure 3:
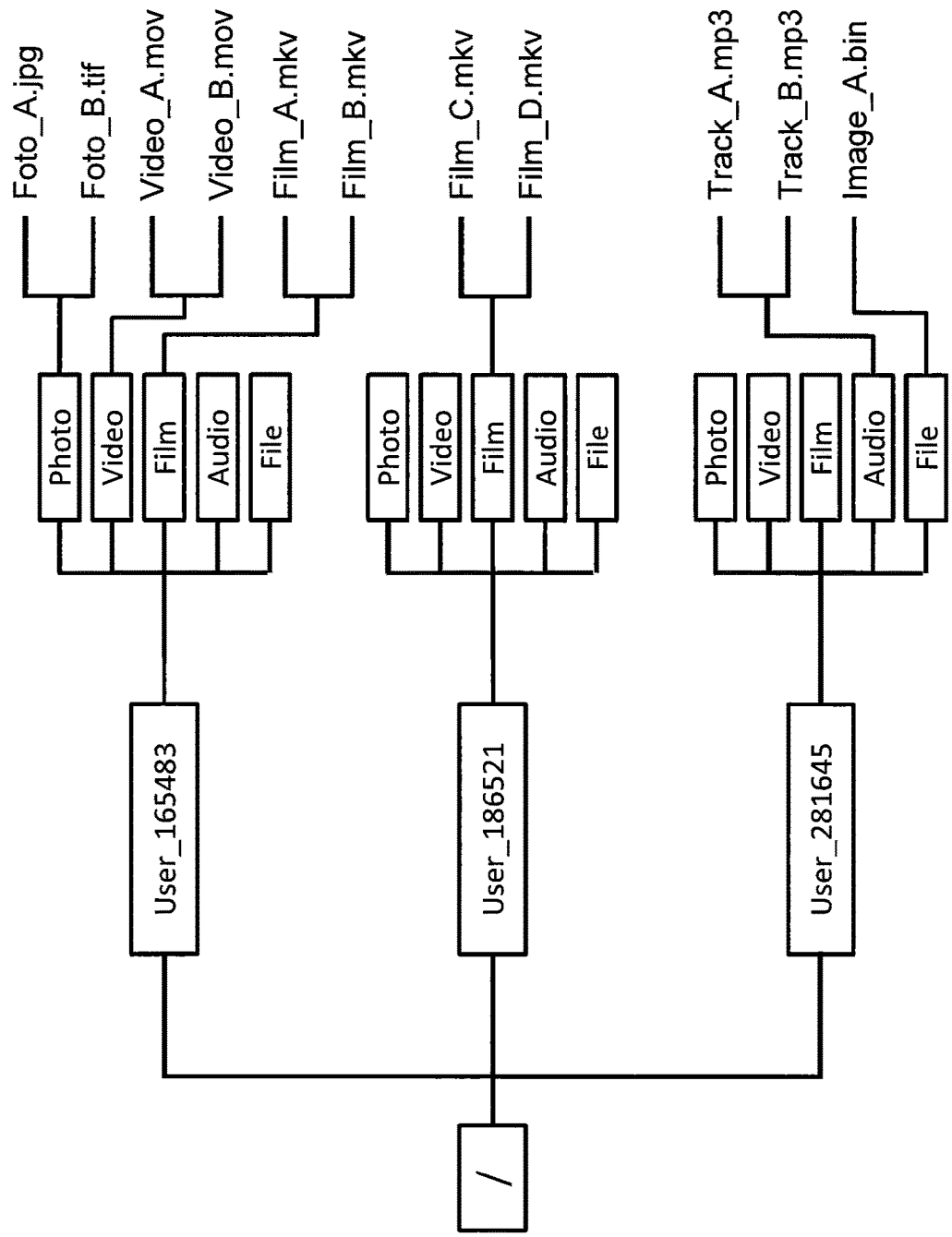
FIG. 3 illustrates a graphical representation of a possible arrangement of files used in the receiver object of the present invention.

With reference to FIG. 3, a possible situation is illustrated wherein the contents of a plurality of user profiles used by the receiver 1 in a working condition in which three main profiles are shown ('User_165483', 'User_186521', 'User_281645'), each of which comprising five sub-folders or content groups ('Photo', 'Video', 'Film', 'Audio', 'File').

Regarding the first functioning profile, namely that recognized with the authentication code '165483' (main folder 'User_165483'), the sub-folder 'Photo' contains two files ('Photo_A.jpg', 'Photo_B.tiff'), the sub-folder 'Video' contains a further two files ('Video_A.mov', 'Video_B.mov'), while the other two files ('Film_A.mkv', 'Film_B.mkv') are stored in the sub-folder 'Film'. In this case the folders 'Audio' and 'File' are empty.

With regards to the second functioning profile, namely that recognized with the authentication code '186521' (main folder 'User_186521'), the sub-folder 'Film' contains two files ('Film_C.mkv', 'Film_D.mkv'), while the other sub-folders are empty.

With regards to the third functioning profile, namely that recognized with the authentication code '281645' (main folder 'User_281645'), the sub-folder 'Audio' contains two files ('Track_A.mp3', 'Track_B.mp3'), the sub-folder 'File' contains a single file ('File_A.bin'), while the other sub-folders are empty.

Figure 4:
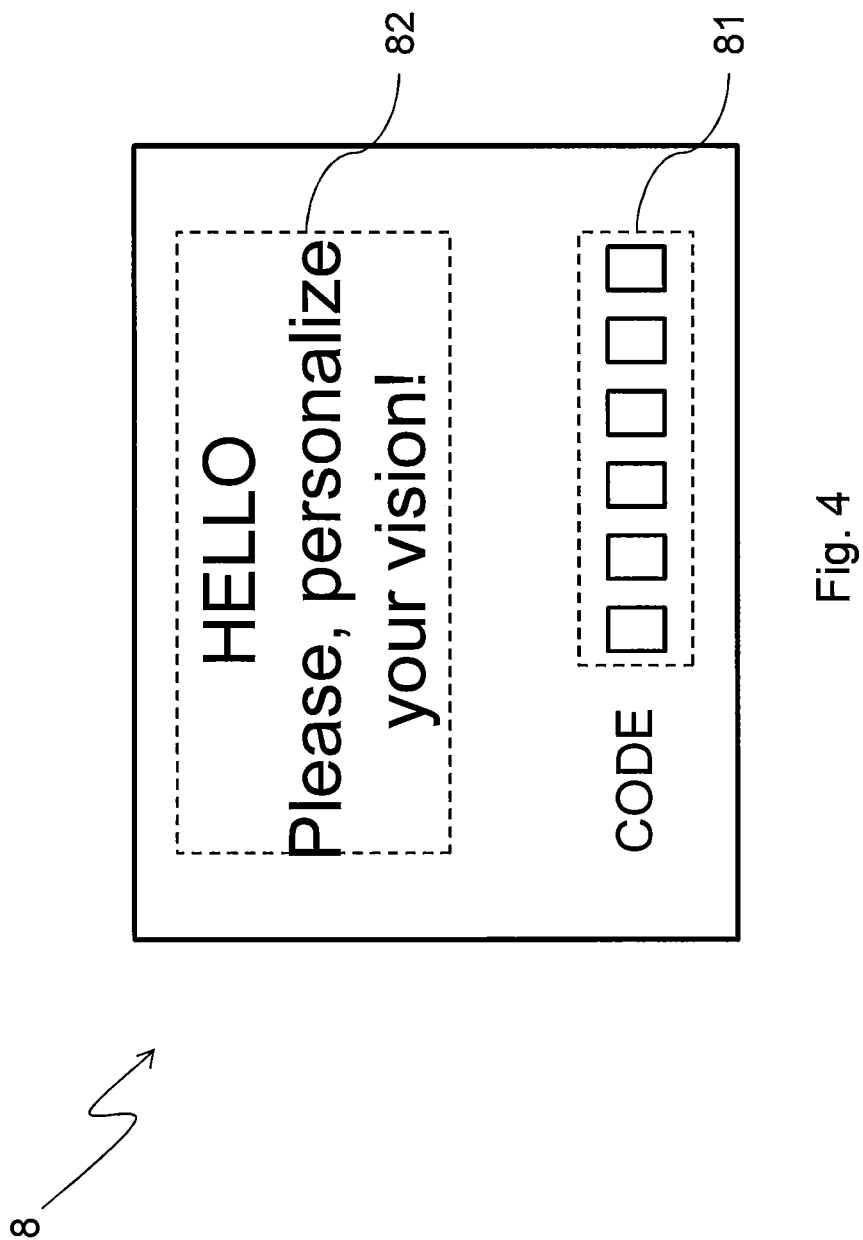
FIG. 4 illustrates a user authentication/recognition interface produced by the receiver of television signals of FIG. 1 during execution of a phase of the method according to the invention.

With reference to FIG. 4, an authentication/recognition screen 8 is illustrated, also called an authentication/recognition interface 8, produced by the receiver of television signals during the state S1 (phase a. of the method according to the invention), comprising a text box 81, wherein the numerical or alphanumerical characters of the authentication/recognition code appear when input by the user, for instance by way of a remote control or other means, such as a voice command or other system (for instance by way of a face recognition algorithm). In order to further improve the level of privacy, a predefined character or symbol may appear in the text box 81 (for example 'X', '*' or similar) for each character of the authentication/recognition code entered by the user.

Moreover, the authentication/recognition screen 8 may also comprise a welcome message 82, that allows the user to understand that the receiver is in the state S1. A possible welcome message may be, for instance: "Hello. Please, personalize your vision."

Technicians of the art may use a different authentication/recognition interface with regards to that described hereinabove, without however for this departing from the teachings of the present invention.

With reference to FIGS. 5-8, a private screen 9 is displayed, also called private interface 9, relative to a first user profile comprising a list of sub-folders 91 and a list-box 92, wherein said list-box 92 can display at least in part the contents, associated to said user profile, of the selected sub-folder in the list of sub-folders 91. The selection of the sub-folder can preferably be carried out by the remote control, for instance using the 'UP', 'DOWN', 'OK' keys. The same procedure of selecting sub-folders is followed in the case that the user wants to memorize private data/contents. Once the desired sub-folder has been selected, it is possible to select within the sub-folders, one or more files contained in the selected sub-folder, so as to execute the display/reproduction of the same. Moreover, it is also possible to not select any file and return to the list-box of other sub-folders, for instance by making use of the 'LEFT' key or a 'return' key of the data input means.

The private screen 9 may also comprise an exit icon 93 that allows for exiting the user profile upon activation, thus activating the "public" mode of the receiver 1. The icon 93 can also be selected by way of traditional navigational arrow keys of the remote control, followed by pressing the "OK" or "Enter" key. As an alternative, the remote control may be supplied with a appropriate dedicated key, indicated with the wording "EXIT", or the exiting function of an active user profile may be obtained by way of selecting a combination of keys.

Moreover, said private screen 9 may also comprise a text box 94 that supplies information relative to the active functioning profile, for example displaying, upon request, the authentication/recognition code associated to said active user profile preceded by the constant word "User_".

The technician of the art may be able to create a privacy interface different from that described hereinabove, without for this departing from the teachings of the present invention.

Figure 5:
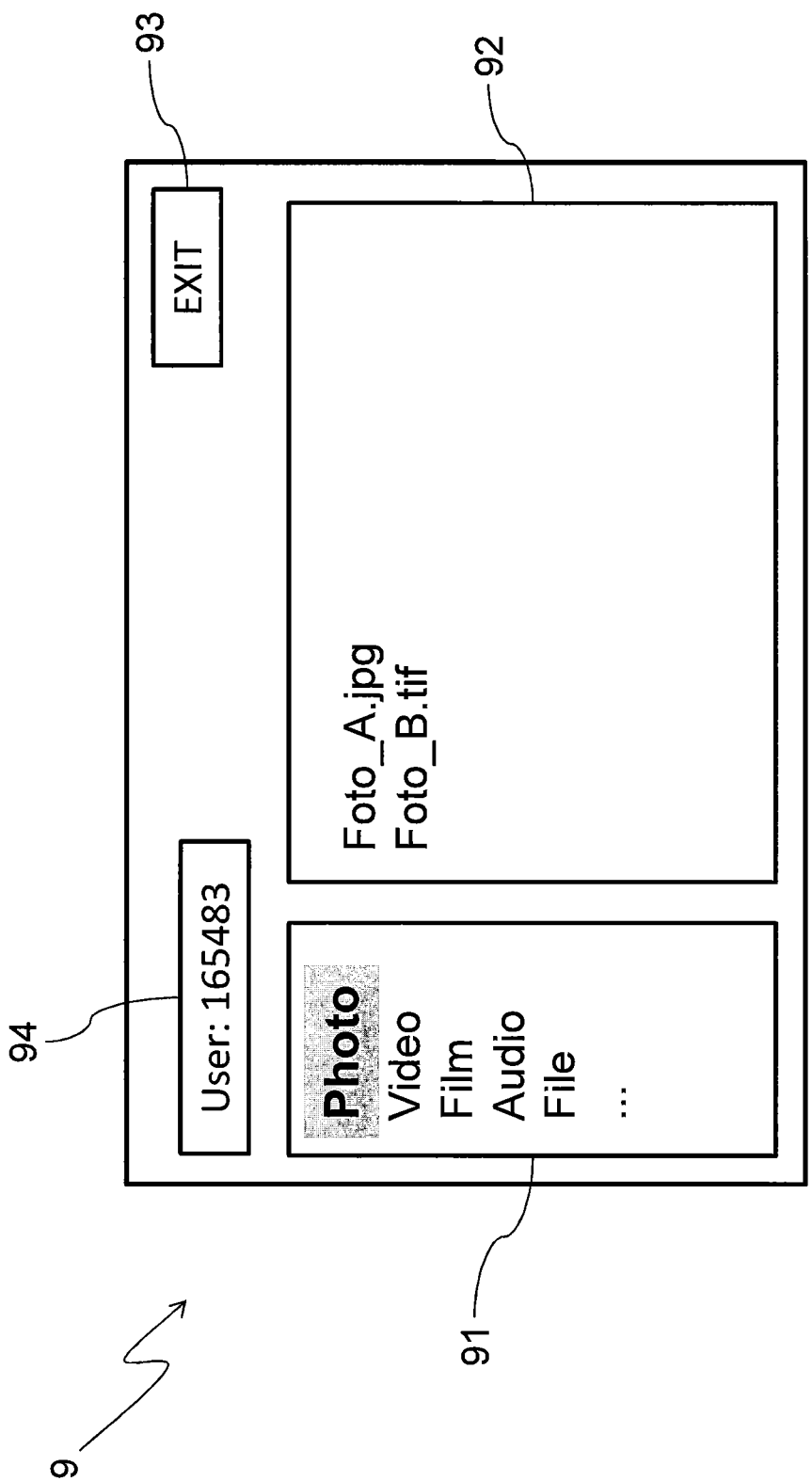
FIGS. 5-8 illustrate the information screens produced by the receiver of television signals of FIG. 1 after activating the method according to the invention.
Figure 6:
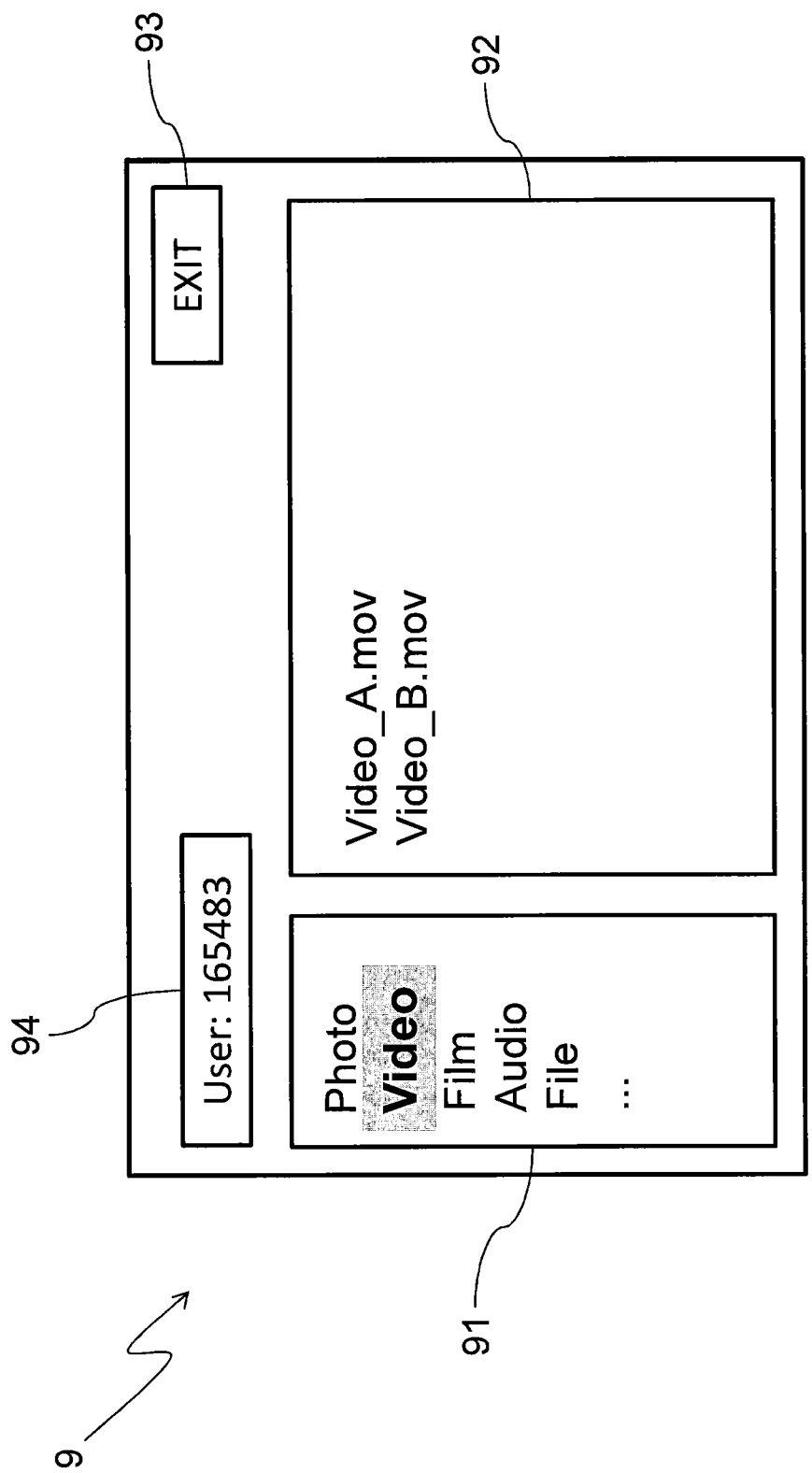
Figure 7:
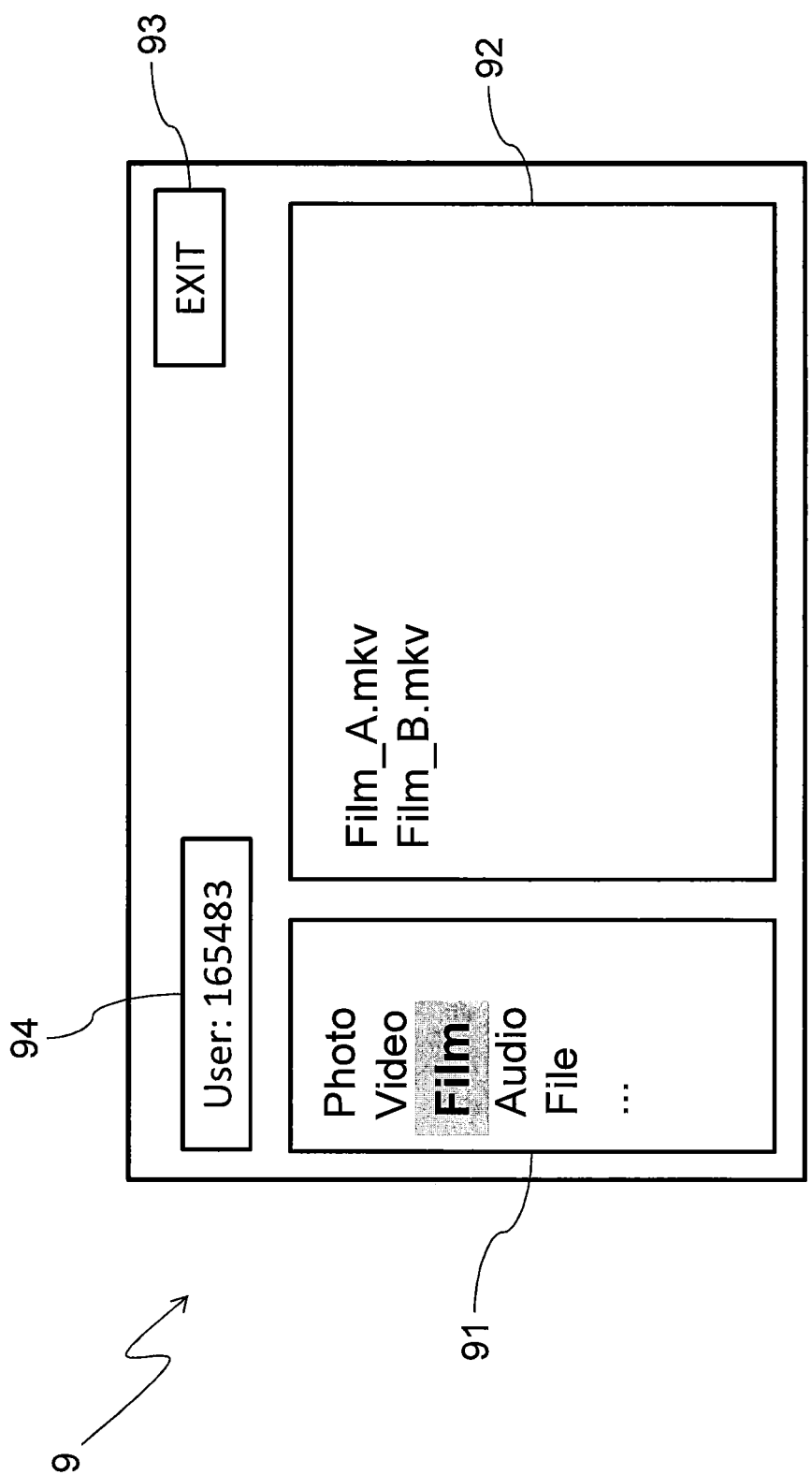

More in detail, the list-box 92 of FIG. 5 displays a list of files contained in the sub-folder 'Photo', as before, relative to the profile associated with the user 'User_165483', which allows access to the files and sub-folders located within the main folder 'User_165483'; while the list-box 92 in FIG. 6 illustrates the list of files contained in the sub-folder 'Video', as before, relative to the profile associated with the user 'User_165483'. In FIG. 7, the list-box 92 illustrates the list of files contained in the sub-folder 'Film', as before, relative to the profile associated with the user 'User_165483'.

Figure 8:
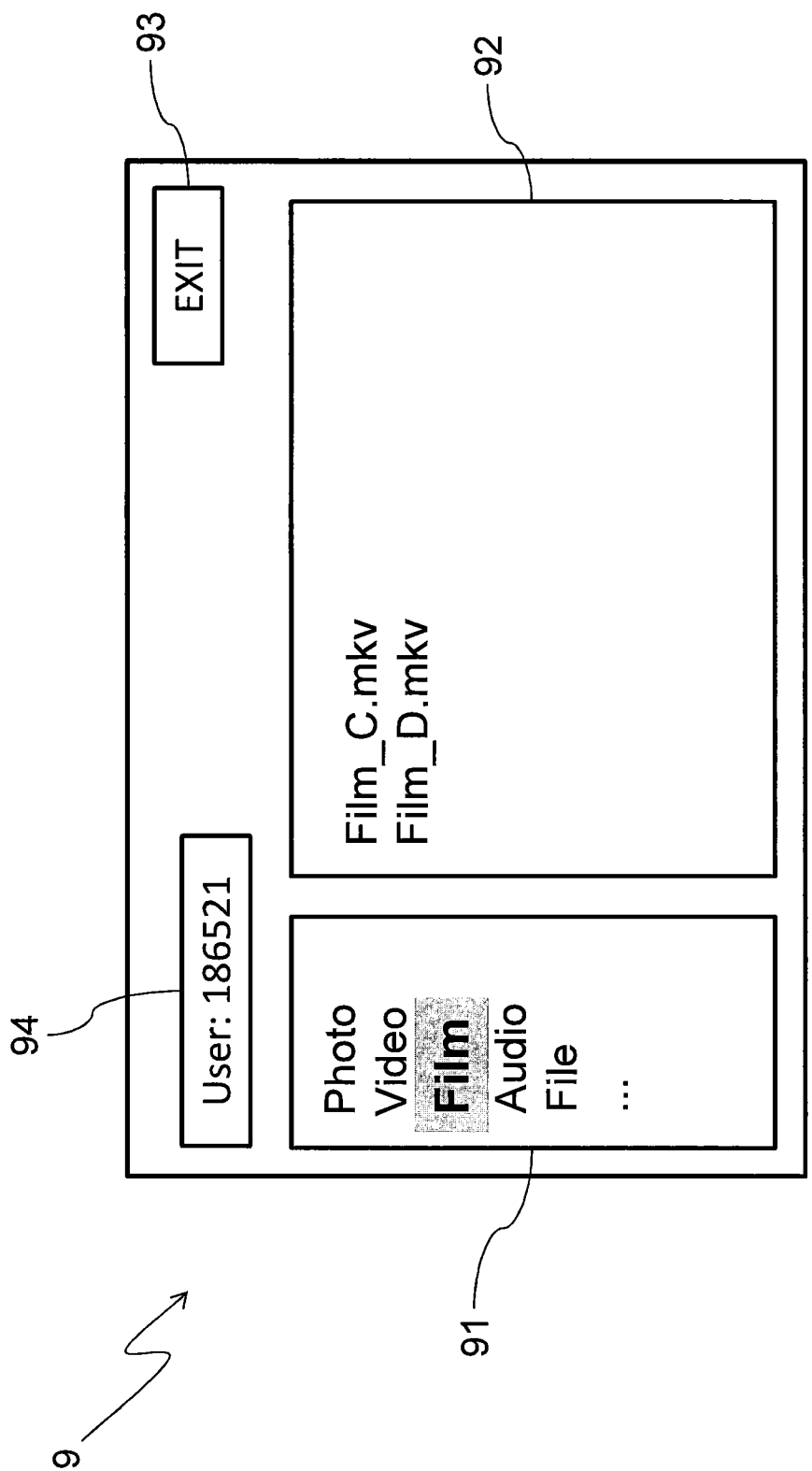

In FIG. 8, the list-box 92 illustrates the list of files contained in the sub-folder 'Film' relative to a different user profile than that illustrated in the previous FIGS. 5-7. It is to be noted that the contents of this list are different than those of FIG. 7; this is due to the effect of isolating the contents obtained by using different functional profiles that distinguish the different users, each of which being able to create a personal "private" profile. Each profile in fact allows for the access to a group of sub-folders that are different from those of every other profile eventually present.

In a variation of the invention, the files and sub-folders contained within the main folder are encrypted by way of an encryption algorithm, preferably symmetrical, that uses a key, so as to further enhance the confidentiality of said private data and to make access to the contents (decrypted) of the memories 3, 13 more difficult in the case in which said memories are attempted to be accessed by a processor different than that contained in the receiver 1.

The encryption/decryption key may be equal to the authentication/recognition code associated to a given operating profile, the key is preferably determined by way of a hash function that receives as an input the authentication code and/or the code contained within an identification chip comprised in the receiver 1 (for instance the serial number of the chip) and/or in a smart-card inserted in said receiver 1.

Due to the fact that modern receivers of television signals are able to update their features through the so-called over the air (OTA) downloading, the method according to the present invention can be obtained by means of uploading and/or updating the software in said memory 13. The uploading and or updating of the software necessary for implementing the method according to the present invention, can also be obtained by way of a memory 3 from which the abovementioned software can be downloaded.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

The invention claimed is:

1. A receiver of television signals received via air, cable, internet or by way of connection to an external device, the receiver comprising:
   memory means in which contents are stored, wherein said contents are received through said receiver;
   data management means for organizing and displaying said contents of said memory means and carrying out an authentication procedure;
   wherein said data management means carries out said authentication procedure that allows for a user to be associated to a user profile via an authentication code;
   wherein said contents comprise a set of private data associated with said user profile;
   wherein said data management means is configured to store and/or access said set of private data, the private data being associated uniquely to said user profile;
   wherein said authentication procedure comprises:
      in response to receiving an authentication code, determining whether a user profile among one or more user profiles is associated with said received authentication code,
      in response to determining that said user profile is associated with said received authentication code, displaying a set of private data associated with said user profile, and
      in response to determining that no user profile is associated with said received authentication code, generating a new user profile and associating said new user profile with said received authentication code; and
   wherein during said authentication procedure, a list of user profiles or usernames is not displayed, such that a user that enters an authentication code cannot see user profiles of other users among said one or more users.

2. The receiver according to claim 1, wherein said data management means is configured to carry out the authentication procedure so as to allow the determined user to be associated to his/her profile in said memory means, and to make said private data available, upon a request of the determined user for said private data stored in said memory means, only if said determined user activates a same user profile that was used during a storage procedure of said private data.

3. The receiver according to claim 1, wherein said authentication procedure comprises phases of:
   (a) starting said authentication procedure by acquiring and validating a particular authentication code, entered by way of data input means;
   (b) initiating functioning of said memory means relative to a user profile associated to the particular authentication code during phase (a); and
   (c) finalizing the authentication procedure when the particular authentication code has been validated, or a key for ending said authentication procedure has been pressed, or a predetermined period of time has lapsed for inserting said particular authentication code.

4. The receiver according to claim 3, wherein, during the phase (b), a new user profile is created and associated to the particular authentication code acquired during the phase (a) if there is no user profile associated to said particular authentication code.

5. The receiver according to claim 3, wherein said data management means carries out said authentication procedure following activation instructions coming from data input means.

6. The receiver according to claim 5, wherein said data management means starts the authentication procedure every time said receiver is turned on.

7. The receiver according to claim 4, wherein said data management means starts said authentication procedure following activation, on said data input means, of a dedicated key or of a combination of non-dedicated keys.

8. The receiver according to claim 5, wherein said data management means causes an exit from said user profile when:
   the receiver, upon instruction of said data input means, is turned off;
   a dedicated key, or a combination of non-dedicated keys is pressed; or
   during the authentication procedure, a complete input of said particular authentication code is not inserted.

9. The receiver according to claim 1, further comprising:
   a user interface;
   where the data management means carries out the authentication procedure of a user profile or carries out an exit procedure from said user profile, following activation of an element of the user interface.

10. The receiver according to claim 1, wherein said receiver is configured so as to allow reception and reproduction of video and/or audio signals, and to store the video and/or audio signals upon request of the user, wherein the video and/or audio signals are associated to a determined user profile in said memory means for successive use once an associated user associated to said video and/or audio signals is validly authenticated.

11. The receiver according to claim 1, wherein said memory means comprises a removable memory means accessible by way of an input-output interface.

12. The receiver according to claim 11, wherein said private data are stored in said removable memory means after an encryption procedure, of said private data to be stored; and
   wherein said receiver comprises means for successively decrypting said private data stored in said removable memory means.

13. The receiver according to claim 3, wherein said memory means are arranged in a way that every file of private contents is stored with a label that contains the particular authentication code relative to the user that created the particular authentication code, so as that specific contents of that part of the memory means where said file of private contents is stored cannot be read unless said particular authentication code that is equivalent to said label has not been inserted beforehand.

14. The receiver according to claim 5, wherein said data input means is configured to connect to a smart phone or tablet.

15. The receiver according to claim 14, wherein inputting said particular authentication code is obtained by way of automatic transmission to the receiver of:
   a unique code contained within the smart phone or tablet;
   an identification code of an NFC (Near Field Communication) device; or
   a finger print of an owner of the smart phone or tablet, identified by the smart phone or tablet through a dedicated reader equipped by software of the smart phone or tablet.

16. The receiver according to claim 5, wherein said data input means comprises a camera that acquires facial features of a user's face and, from the facial features, obtains a unique code to use as the particular authentication code of said determined user.

17. The receiver according to claim 1, wherein said private data are arranged in said memory means in a hierarchical manner, organized in information groups.

18. A method for storing, organizing, and displaying contents received by a receiver of television signals, by air, cable, Internet, or by way of connection to external devices, the method comprising carrying out at least the following phases:
   (a) starting a user authentication procedure by acquiring an authentication code that is entered by way of a data input means;
   (b) in response to determining that a user profile is associated with said authentication code, activating said user profile associated to said authentication code entered during phase (a); or in response to determining that no user profile is associated with said authentication code, generating a new user profile, associating said new user profile with said authentication code, and activating said new user profile;
   (c) associating operations carried out on said receiver within said user profile or said new user profile activated during phase (b), until exiting said user profile or said new user profile,
   wherein a memory means stores content for each user profile created via said receiver, said content including private data of a particular user, and
   wherein during said authentication procedure, a list of user profiles or usernames is not displayed, such that a user that enters said authentication code cannot see user profiles of other users.

19. The method according to claim 18, wherein said receiver is configured so as to create a new user profile associated to the authentication code, if, during said phase (b), it is not possible to identify any existing user profile in said memory means associated to said authentication code specified during the procedure of phase (a).

20. The method according to claim 18, wherein for exiting a state from which it is possible to store or have access to private data;
   said receiver, by way of a data input means, is turned off;
   a dedicated key is pressed, or a combination of one or more non-dedicated keys is pressed; or
   inputting said authentication code is not completed during the authentication procedure.

21. The method according to claim 18, wherein, for implementing said method, said receiver of television signals comprises a user interface;
   and wherein a data management means carries out the authentication procedure of a user profile or carries out exiting of said user profile, following activation of an element of the user interface.

22. The method according to claim 18, wherein said authentication code comprises a numeric or alphanumeric string of a fixed length.

23. A computer program product configured to implement the method according to claim 18.

24. A computer program product configured to implement the method according to claim 22.

25. The receiver of claim 1, wherein, while the authentication procedure is being carried out, the receiver:
   receives a single symbol inserted at a location where the authentication code is received;
   in response to only the single symbol being inserted at the location, waiting a predetermined amount of time; and
   after the predetermined amount of time elapses, ending the authentication procedure and permitting whichever user who entered the single symbol to use the receiver in a public functioning state.

* * * * *